US011865378B2

(12) United States Patent
Schroeder

(10) Patent No.: US 11,865,378 B2
(45) Date of Patent: Jan. 9, 2024

(54) MOBILE SAFETY FALL ARREST CART

(71) Applicant: FRANK P. FREY AND COMPANY, Bensenville, IL (US)

(72) Inventor: David Wayne Schroeder, Blue Springs, MO (US)

(73) Assignee: FRANK P. FREY AND COMPANY, Bensenville, IL (US)

( * ) Notice: Subject to any disclaimer, the term of this patent is extended or adjusted under 35 U.S.C. 154(b) by 1062 days.

(21) Appl. No.: 16/298,899

(22) Filed: Mar. 11, 2019

(65) Prior Publication Data

US 2019/0201723 A1 Jul. 4, 2019

Related U.S. Application Data

(63) Continuation-in-part of application No. 15/177,010, filed on Jun. 8, 2016, now Pat. No. 10,226,650.

(60) Provisional application No. 62/172,681, filed on Jun. 8, 2015.

(51) Int. Cl.
*A62B 35/00* (2006.01)
*E04G 21/32* (2006.01)

(52) U.S. Cl.
CPC .......... *A62B 35/0068* (2013.01); *A62B 35/00* (2013.01); *E04G 21/329* (2013.01); *E04G 21/3233* (2013.01); *E04G 21/3276* (2013.01)

(58) Field of Classification Search
CPC ........................ A62B 35/0068; E04G 21/3233
See application file for complete search history.

(56) References Cited

U.S. PATENT DOCUMENTS 6,227,553 B1 * 5/2001 Palmer ................ E04G 21/3261 414/673
8,100,228 B2 * 1/2012 Hamilton ................ B66C 23/72 280/43
8,240,431 B2 * 8/2012 Smith .................... A62B 35/04 482/45
8,312,680 B2 * 11/2012 Krahn ....................... E02D 5/80 52/155
8,584,798 B2 * 11/2013 Stoffels .................. A62B 99/00 182/45
9,056,211 B2 * 6/2015 Jones .................. E04G 21/3276
9,186,529 B2 * 11/2015 Correia .............. A62B 35/0068
9,675,824 B2 * 6/2017 MacKarvich ...... A62B 35/0068
10,118,057 B2 * 11/2018 Dyer ....................... F16H 35/18
10,183,185 B2 * 1/2019 Carroccia .......... A62B 35/0068
(Continued)

OTHER PUBLICATIONS

"Final Office Action Received for U.S. Appl. No. 15/177,010, dated Jul. 2, 2018, 9 Pages."
(Continued)

*Primary Examiner* — Jessica L Laux
*Assistant Examiner* — Kathleen M. McFarland
(74) *Attorney, Agent, or Firm* — Kutak Rock LLP; Eric S. Endsley

(57) ABSTRACT

A mobile safety fall arrest cart is provided. The mobile safety fall arrest cart is configured to move along an edge of an elevated surface as a worker works along the edge. The worker is connected to the cart with a safety line. If the worker falls from the elevated surface, the weight of the worker causes a spike assembly to move from a stowed configuration to a deployed configuration. In the deployed configuration, a spike member engages the elevated surface so as to assist in arresting the worker's fall.

17 Claims, 6 Drawing Sheets

(56) References Cited

U.S. PATENT DOCUMENTS

| | | | | |
|---|---|---|---|---|
| 10,226,650 | B2 * | 3/2019 | Schroeder | E04G 21/3276 |
| 10,456,608 | B2 * | 10/2019 | Johanneck | A62B 35/0068 |
| 11,104,365 | B2 * | 8/2021 | MacKarvich | B62B 5/049 |
| 11,167,782 | B1 * | 11/2021 | MacKarvich | B62B 5/049 |
| 11,305,803 | B2 * | 4/2022 | MacKarvich | B62B 5/049 |
| 11,452,892 | B2 * | 9/2022 | Kelly | A62B 35/0068 |
| 2007/0289811 | A1 * | 12/2007 | Smith | A62B 35/04 182/3 |
| 2009/0114478 | A1 * | 5/2009 | Hamilton | E04G 21/3238 16/400 |
| 2009/0321184 | A1 * | 12/2009 | Hamilton | A62B 99/00 182/3 |
| 2011/0303484 | A1 * | 12/2011 | Stoffels | A62B 99/00 254/1 |
| 2013/0264442 | A1 * | 10/2013 | Correia | E04G 21/3276 248/205.1 |
| 2015/0104279 | A1 * | 4/2015 | Kenton | E04G 21/3233 414/812 |
| 2016/0332011 | A1 * | 11/2016 | MacKarvich | A62B 35/0068 |
| 2017/0021206 | A1 * | 1/2017 | Schroeder | E04G 21/3276 |
| 2017/0144685 | A1 * | 5/2017 | McVay | B62B 3/104 |
| 2017/0225017 | A1 * | 8/2017 | Johanneck | A62B 35/0068 |
| 2017/0232280 | A1 * | 8/2017 | Carroccia | A62B 35/0068 182/3 |
| 2017/0312559 | A1 * | 11/2017 | Dyer | A62B 35/0068 |
| 2019/0277047 | A1 * | 9/2019 | Barlow | E04G 21/3214 |
| 2020/0398089 | A1 * | 12/2020 | Kelly | A62B 35/0068 |
| 2021/0009183 | A1 * | 1/2021 | MacKarvich | B62B 5/049 |

OTHER PUBLICATIONS

"Non-Final Office Action Received for U.S. Appl. No. 15/177,010, dted Oct. 18, 2017."

"Notice of Allowance Received for U.S. Appl. No. 15/177,010, dated Oct. 24, 2018, 9 pages"

* cited by examiner

MOBILE SAFETY FALL ARREST CART

CROSS-REFERENCE TO RELATED APPLICATIONS

This application is a continuation-in-part application of co-pending U.S. patent application Ser. No. 15/177,010, filed Jun. 8, 2016, now U.S. Pat. No. 10,226,650, which claims priority pursuant to 35 U.S.C. 119(e) to U.S. Provisional Patent Application Ser. No. 62/172,681, filed Jun. 8, 2015, the entire disclosures of which are incorporated herein by reference.

FIELD OF THE INVENTION

The present invention relates generally to fall arresting safety devices and methods of arresting falls. More specifically, the present invention is concerned with a mobile safety fall arrest cart for use by workers on a flat roof or other flat or relatively flat elevated surfaces.

BACKGROUND OF THE INVENTION

Roofing contractors use a variety of fall arrest systems to protect their workers from falls. It is also preferable that these carts meet Occupational Safety and Health Administration (OSHA) requirements. In many applications, such as on a flat roof, a fall arrest cart is the most convenient way to prevent catastrophic injury.

Fall arrest carts, such as those described in U.S. Pat. Nos. 8,240,431 and 6,227,553, generally include wheels and a braking system so that the mobile cart can be selectively moved into and held in position on an elevated surface, such as a flat rooftop.

The '431 patent further discloses an arrestor arm having an engagement plate that is movable between a disengaged position and an engaged position. In the disengaged position, the engagement plate is pivoted up and away from the elevated surface. In the engaged position, the engagement plate is pivoted into the elevated surface. A pulling force that is directly proportional to the weight of a person that has fallen and the velocity of the person's fall is exerted on the arrestor arm to move the engagement plate from the disengaged position to the engaged position. An arm support exerts a resistance force upon the arrestor arm to bias the engagement plate towards the disengaged position. Consequently, the pulling force must overcome the resistance force before the engagement plate will move towards the engaged position. Furthermore, as the engagement plate is moved towards the engaged position, and even when the engagement plate is in the engaged position, the resistance force biasing the engagement plate towards the disengaged position causes the net force biasing the engagement plate towards the engaged position to be less than the portion of the pulling force that biases the engagement plate towards the engaged position. Furthermore still, because the engagement plate pivots down towards the elevated surface, the portion of the pulling force that biases the engagement plate towards the engaged position is greater at the engaged position than it is at the disengaged position or even at an intermediate position when the engagement plate first comes into contact with the elevated surface.

Thus, it would be beneficial to have a mobile safety fall arrest cart that does not include an arm support. Furthermore, it would be beneficial to have a mobile safety fall arrest cart that does not exert a resistance force on an arrestor arm as an engagement plate pivots from a disengaged position to an engaged position, especially as the engagement plate is penetrating the elevated surface. Furthermore still, it would be beneficial if the mobile safety fall arrest cart includes a spike assembly having a spike member that does not pivot as the spike member makes contact with the elevated surface. Furthermore still, it would be beneficial if a portion of a pulling force that biases the spike assembly towards a final position was greatest while the spike member is moving to the final position rather than when the spike member is in the final position.

SUMMARY OF THE INVENTION

A mobile safety fall arrest cart of the present invention is configured for use on an elevated surface and includes a spike assembly and a trigger assembly. The spike assembly is movable between a stowed configuration and a deployed configuration. In the stowed configuration, the spike assembly is displaced from the elevated surface, thereby allowing the cart to be moved relative to the elevated surface. In the deployed configuration, at least a portion of the spike assembly penetrates into the elevated surface, thereby inhibiting movement of the cart relative to the elevated surface.

In some embodiments, the trigger assembly is moveable between a set configuration and a released configuration. In some such embodiments, the trigger assembly is configured to retain the spike assembly in the stowed configuration when the trigger assembly is in the set configuration. In other such embodiments, the trigger assembly is configured to allow the spike assembly to move from the stowed configuration to the deployed configuration when the trigger assembly is moved from the set configuration to the released configuration.

In some embodiments, a safety cable or tether is connected to a worker on one end and the trigger assembly on the other end. In some such embodiments, the safety cable causes the trigger assembly to move from the set configuration to the released configuration if the worker falls from the elevated surface. In other embodiments, the safety cable is connected to the spike assembly. In some such embodiments, the weight of the worker biases the spike assembly towards the deployed configuration.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 3:
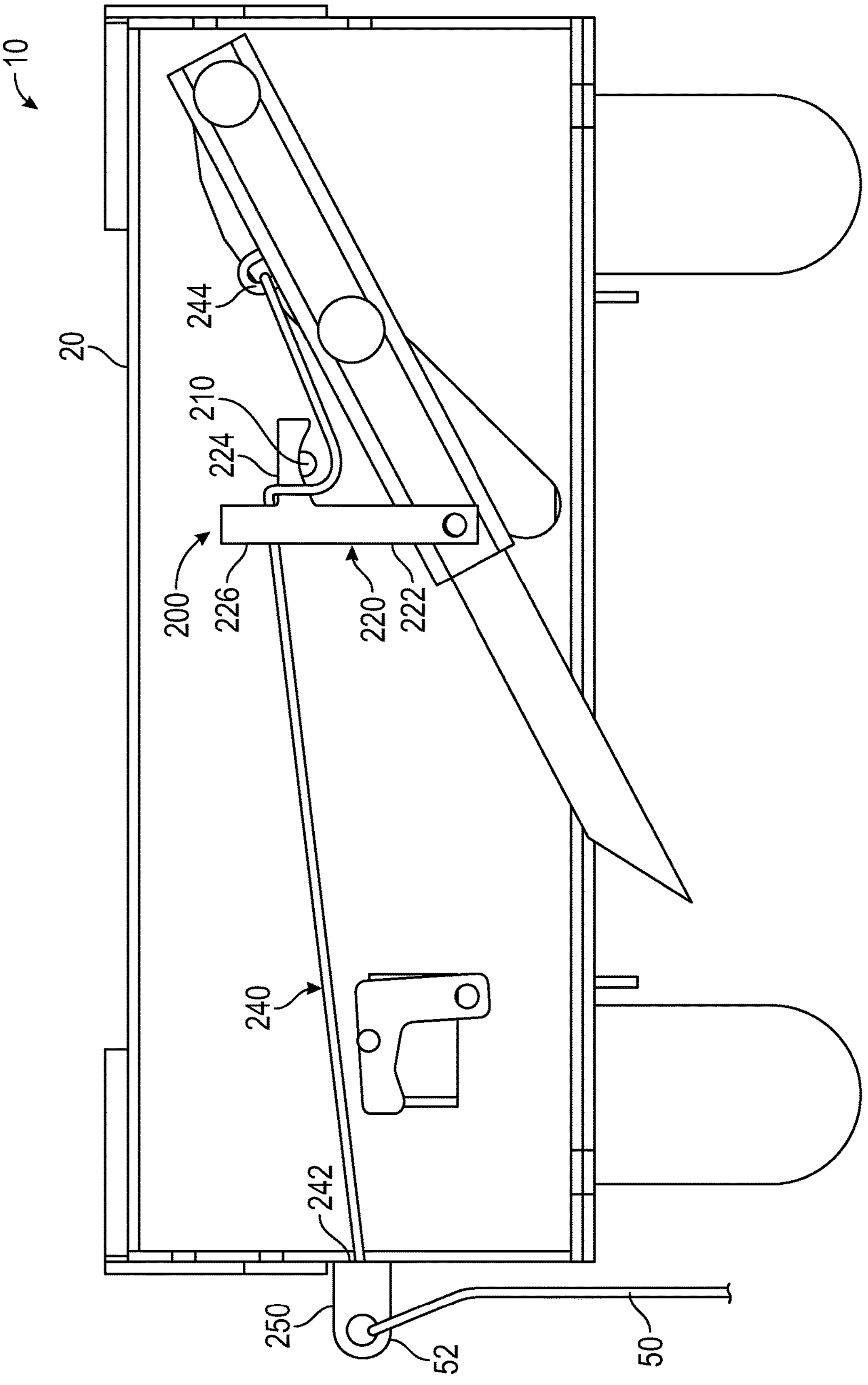
FIG. 3 is a rear elevation sectional view the Fall Arrest Cart of FIG. 1 showing the spike assembly in a stowed configuration with the spike member in a disengaged configuration.

Referring to FIG. 3, a mobile safety fall arrest cart 10 of the present invention includes a spike assembly 100 coupled to a mobile cart 20 and a trigger assembly 200 operatively coupled to the spike assembly 100. The mobile cart is configured to be support the trigger assembly over a flat or relatively flat elevated surface. The spike assembly is movable between a stowed configuration and a deployed configuration. In the stowed configuration, the spike assembly is displaced from the elevated surface so as to prevent the spike assembly from damaging the elevated surface. In the deployed configuration, the spike assembly is configured to engage the elevated surface.

The trigger assembly is movable between a set configuration and a released configuration. In the set configuration, the trigger assembly retains the spike assembly in the stowed configuration. In the released configuration, the trigger assembly allows the spike assembly to move from the stowed configuration to the deployed configuration. It will be appreciated that in some embodiments one or more component of the trigger assembly is coupled to and/or integrated with one or more component of the spike assembly.

In use, the mobile safety fall arrest cart is moved into position on an elevated surface and a first end 52 of a fall arrest safety cable or tether 50 is connected to a tether clip 250 of the trigger assembly. A second end (not shown) of the safety cable or tether is connected to a worker. In the event that the worker falls from the elevated surface, the worker's weight causes the trigger assembly to move from the set configuration to the released configuration, thereby allowing the spike assembly to move from the stowed configuration to the deployed configuration. In this way, the present invention is capable of arresting the worker's fall by engaging the elevated surface. It is preferred that the spike punctures the elevated surface.

In some embodiments, the mobile cart includes at least two wheels oriented in a fore/aft direction such that the mobile cart is at least movable in a fore/aft direction. In some such embodiments, at least one of the wheels is steerable so that a worker can more easily maneuver the mobile cart. In other embodiments, the wheels are operatively connected to a brake system that is moveable between a locked configuration and a released configuration. When the brake system is in the released configuration, the wheels are free to rotate, thereby enabling the mobile cart to be moved along the elevated surface. When the brake system is in the locked configuration, the brake system prevents or inhibits the wheels from rotating, thereby inhibiting the mobile cart's ability to move along the elevated surface. In this way, the mobile cart, alone, is capable of providing some level of fall arrest protection. In some embodiments, further features, such as additional cables or tethers coupled to the fall arrest cart and to one or more stationary object, provides additional levels of fall arrest protection.

In a preferred embodiment, the spike assembly is oriented generally laterally relative to the mobile cart. In this way, the combined level of fall arrest protection of the mobile cart and the spike assembly is generally greater than the combined level of fall arrest protection of a mobile cart and spike assembly that are oriented generally parallel with each other. Furthermore, by orienting the spike assembly generally laterally to the mobile cart, a worker can more easily move the fall arrest cart along an edge of the elevated surface as the worker moves along the edge of the elevated surface.

Figure 1:
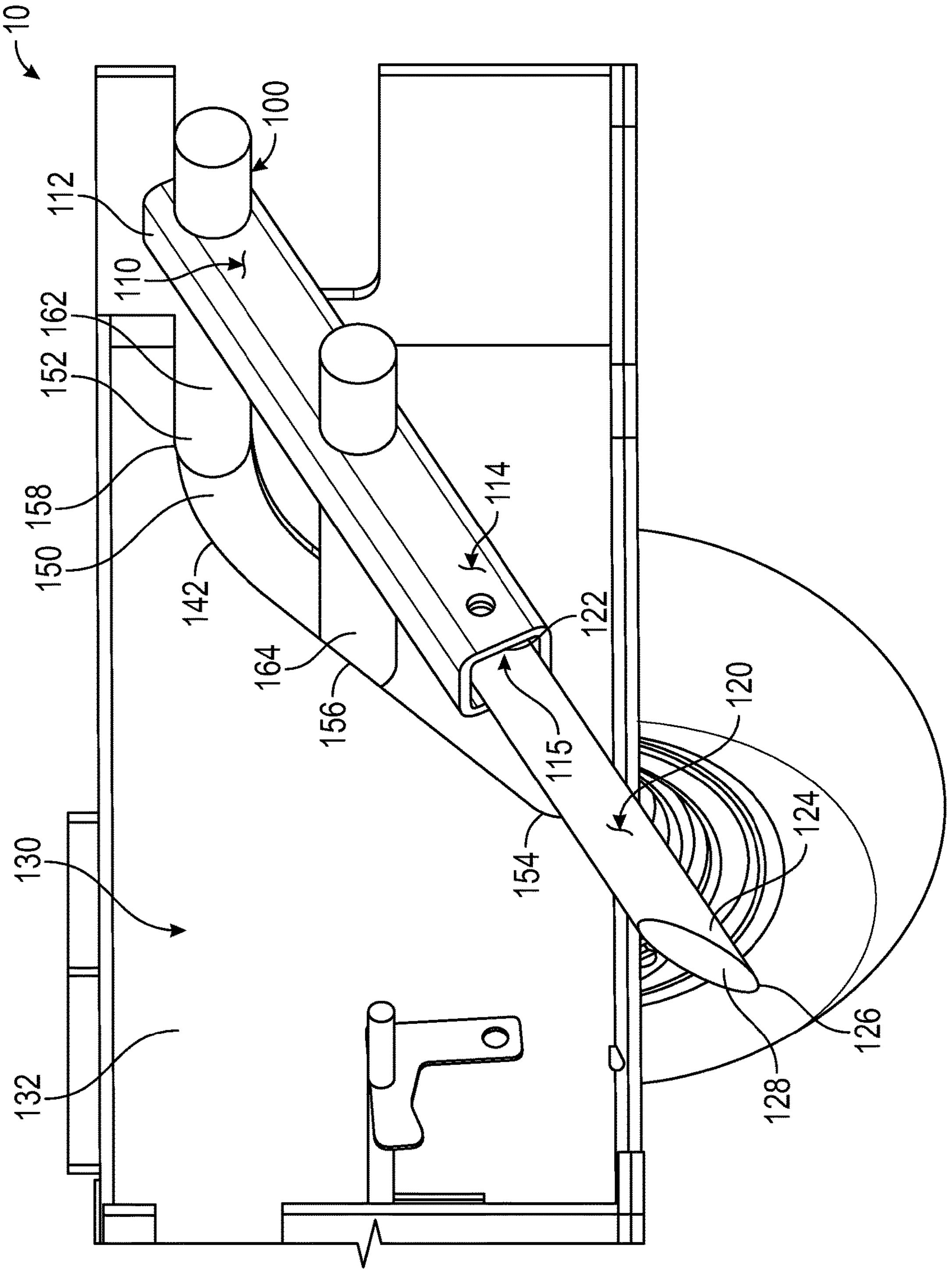
FIG. 1 is partial perspective view of a Mobile Safety Fall Arrest Cart showing a spike assembly in a stowed configuration, FIG. 1 further showing a front support wall defining a front raceway, an opposed rear support wall defining a corresponding rear raceway being substantially a mirror image thereof.
Figure 2:
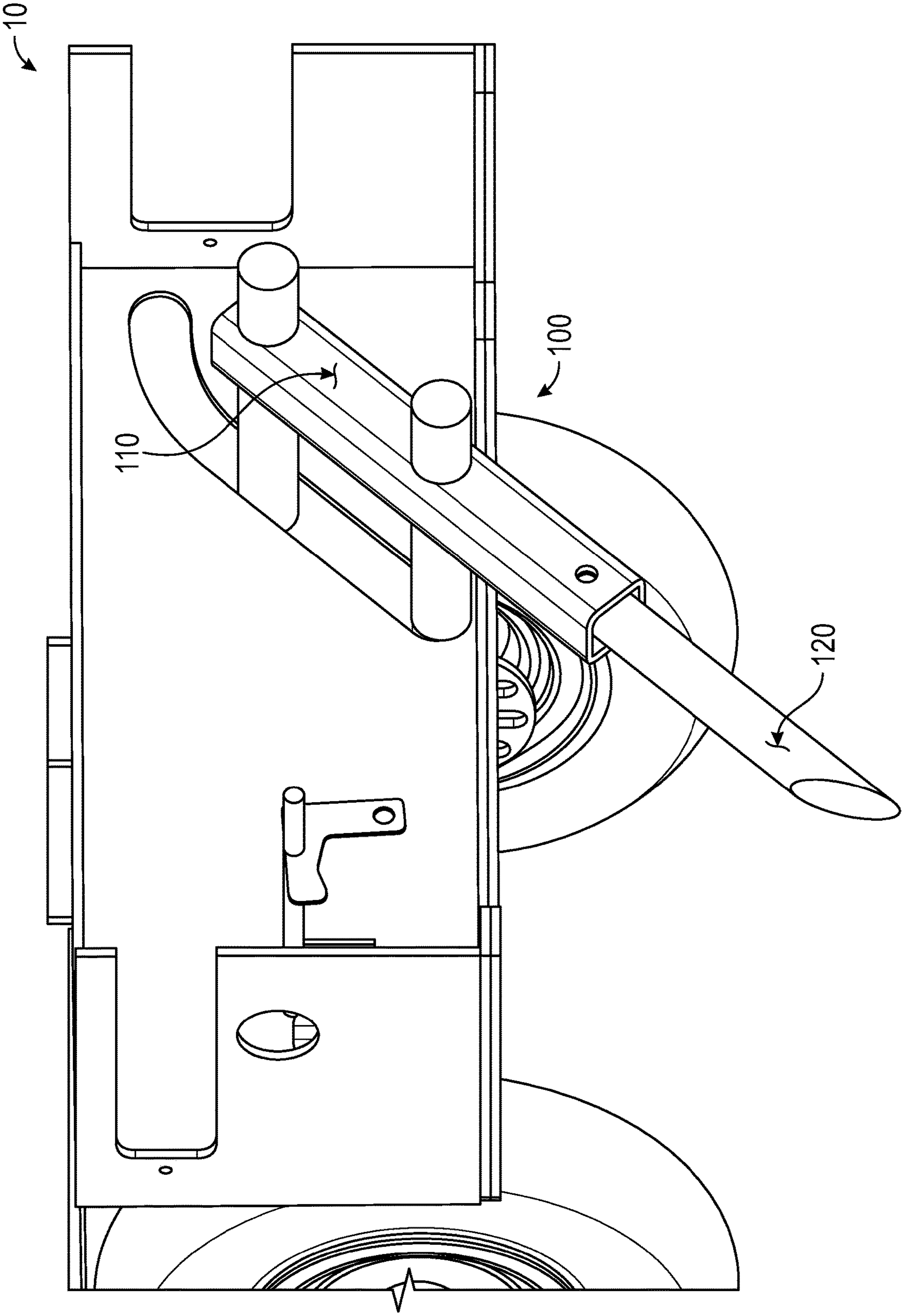
FIG. 2 is a partial perspective view of the Fall Arrest Cart of FIG. 1 showing the spike assembly in a fully deployed configuration.

Referring to FIG. 1, a preferred embodiment of the spike assembly includes a sleeve member 110 having proximal 112 and distal 114 ends and a spike member 120 extending from the distal end of the sleeve member. In some such embodiments, a proximal end 122 of the spike member is coupled to the distal end of the sleeve member. In other such embodiments, the sleeve member defines an elongate interior area 115 that is configured to receive the proximal end of the spike member. In this way, the length of the spike assembly, and/or the depth of the spike member when the spike assembly is in a deployed configuration, can be adjusted by increasing or decreasing the distance the proximal end of the spike member is inserted into the interior area of the sleeve member.

A distal end 124 of the spike member is configured to pierce the elevated surface while the spike assembly is moving from the stowed configuration to the deployed configuration. In some such embodiments, the distal end of the spike member includes a cutting edge 126 that is configured to facilitate cutting approximately vertically through the elevated surface. In other such embodiments, the distal end of the spike assembly includes a bearing surface 128 that is configured to prevent or inhibit cutting horizontally through the elevated surface. In this way, the distal end of the spike member is configured to engage the elevated surface so as to anchor the mobile safety fall arrest cart of the elevated surface. Preferably, the spike member is configured to become embedded in the elevated surface.

In a preferred embodiment, the spike assembly further includes a support structure 130 having front support wall 132 and an opposed rear support wall (not shown). The front support wall defines a front raceway 142 and the rear support wall defines a corresponding rear raceway (not shown). Together, the front and rear raceways define a track 150. The sleeve member is positioned between the front and rear support walls of the support structure and one or more support member 162, 164 extends from the sleeve member into the track such that a first end 152 of the track defines the stowed configuration of the spike assembly and a second end 154 of the track defines the deployed configuration of the spike assembly.

Some embodiments of the present invention include multiple sleeve members and multiple support members extending through multiple raceways of multiple support walls. In some such embodiments, one or more sleeve member is positioned between one or more support wall with a support member extending through a raceway of each support wall such that the sleeve member is supported by both support walls. In other such embodiments, one or more sleeve member is supported at an end of a support member with the support member extending through at least one raceway of at least one support wall such that the support member is supported by the at least one support wall. In still other embodiments, multiple support walls are positioned relatively adjacent to each other with at least one support member extending through a raceway of each support wall such that one or more sleeve member is supported by each support wall.

Referring to FIG. 1, the track includes a straight section 156 extending from the second end of the track towards the first end of the track. In some such embodiments, such as the embodiment shown in FIG. 1, the track also includes a curved section 158 extending from the straight section of the track towards the first end of the track. It will be appreciated that the curved section is not necessarily curved but instead, in some embodiments, is a section of the track that is distinguishable from the straight section of the track.

In a preferred embodiment, the spike assembly includes first 162 and second 164 support members coupled to the sleeve member and extending from the sleeve member into each raceway of the track. The first 162 support member is coupled to the sleeve member at or near the distal end of the proximal end of the sleeve member. The second support member 164 is coupled to the sleeve member between the first support member and the distal end of the sleeve member. In this way, the support members control the orientation of the sleeve member and the spike member as the spike assembly is moved from the stowed configuration to the deployed configuration.

When the second support member is positioned at the second end of the track, the spike assembly is in a fully deployed configuration. At the fully deployed configuration, the spike assembly prevents the spike member from penetrating further into the elevated surface. In use, the elevated surface itself may prevent the spike member from penetrating the surface at all or may prevent the spike member from penetrating the surface beyond a certain depth. In some such instances, the spike assembly is positioned in a partially deployed configuration between the stowed configuration and the fully deployed configuration. In each deployed configuration, whether a fully deployed configuration or a partially deployed configuration, the spike member is oriented at a first angle relative to the elevated surface. In some embodiments, the first angle is approximately forty-five (45) degrees. While the spike member is oriented at the first angle, the spike assembly is in an engaged configuration. Consequently, when each support member is positioned in a straight portion of the track, the spike member remains in the engaged configuration.

The deployed configuration of the spike assembly corresponds with the engaged configuration of the spike member. In some embodiments (not shown) that do not include a curved section of the track and/or that only include a straight section of the track, the stowed configuration of the spike assembly also corresponds with the engaged configuration of the spike member. In other embodiments that do include a curved section, the stowed configuration of the spike assembly corresponds with a disengaged configuration of the spike member. When the spike member is in the disengaged configuration, the spike member is oriented at a second angle relative to the elevated surface. In a preferred embodiment, the second angle is flatter relative to the elevated surface than is the first angle such that the distal end of the spike member is rotated up and away from the elevated surface as the spike member is moved from the engaged configuration to the disengaged configuration and is moved down and towards the elevated surface when the spike member is moved from the disengaged configuration to the engaged configuration. In this way, the clearance between the spike member and the elevated surface when the spike member is in the stowed configuration is increased for a spike assembly that includes a curved section of a track relative to a spike assembly that does not include a curved section of a track.

In a preferred embodiment, the spike member penetrates the elevated surface after and only after the spike member moves to the engaged configuration. In some other preferred embodiments, the spike member remains in the engaged configuration throughout the penetration process. Consequently, the spike member does not rotate during the penetration process. It will be appreciated, however, that in other embodiments the spike member does rotate during the penetration process.

It will be appreciated that some embodiments of the present invention include a single linkage, such as a shaft member on a two-bar track. It will also be appreciated that other embodiments of the present invention include a multi-bar linkage. In some such embodiments (not shown), a scissor action is utilized in moving the spike assembly between the stowed configuration and the deployed configuration.

Figure 4:
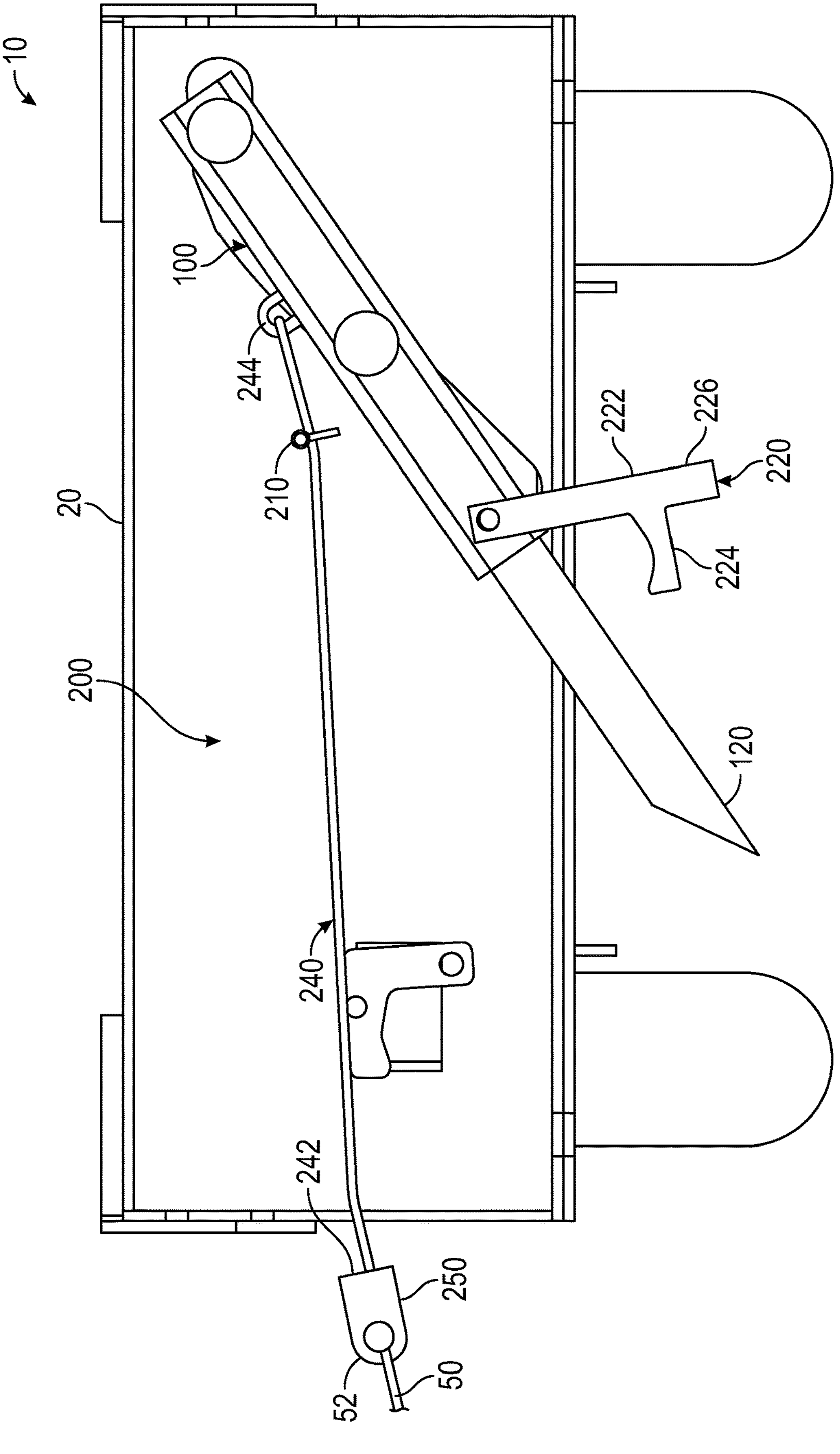
FIG. 4 is the rear elevation sectional view of FIG. 3 showing the spike assembly and the spike member in respective intermediate configurations.
Figure 5:
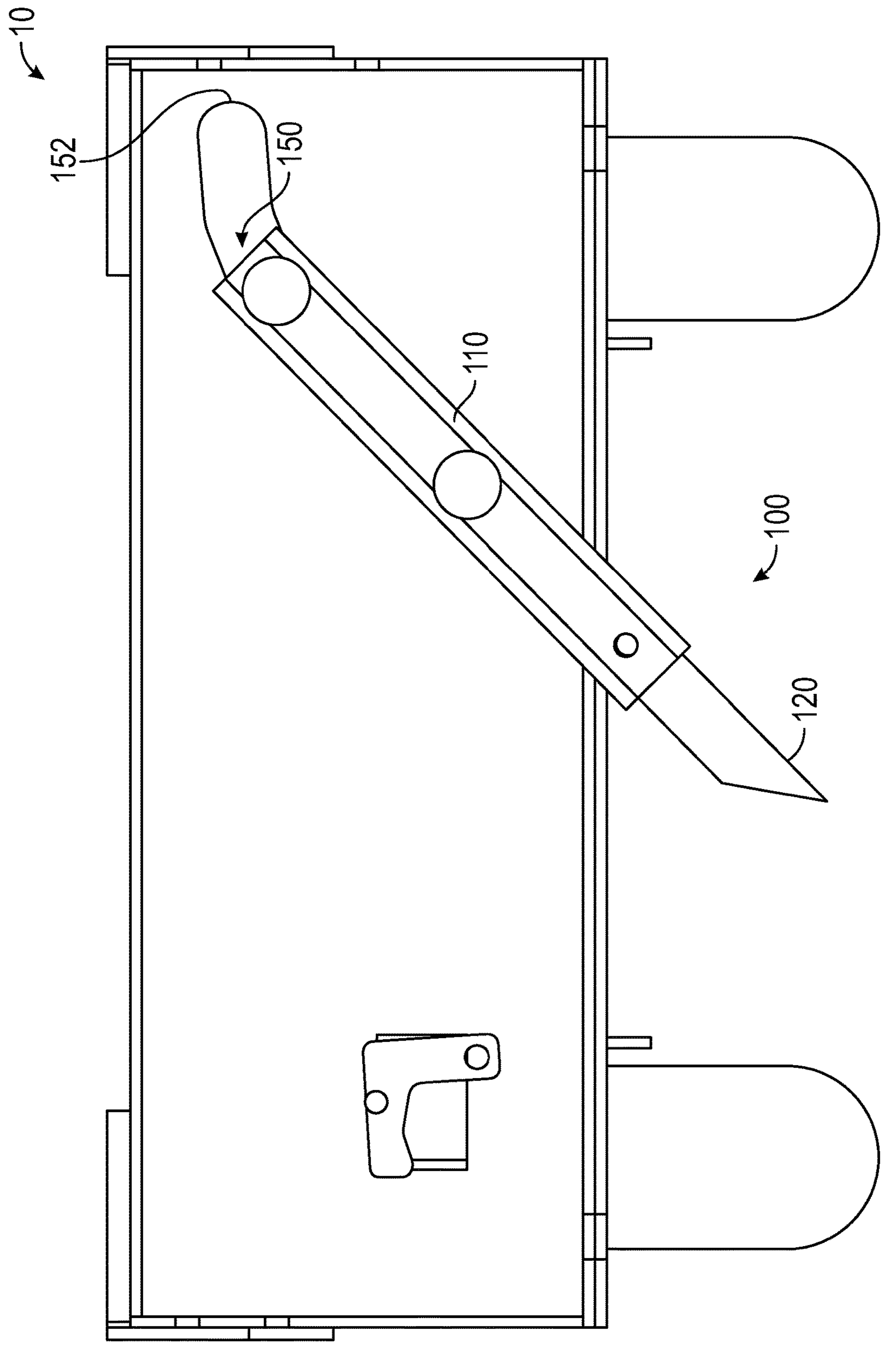
FIG. 5 is the rear elevation sectional view of FIG. 3 showing the spike assembly in an intermediate configuration and the spike member in an engaged configuration.
Figure 6:
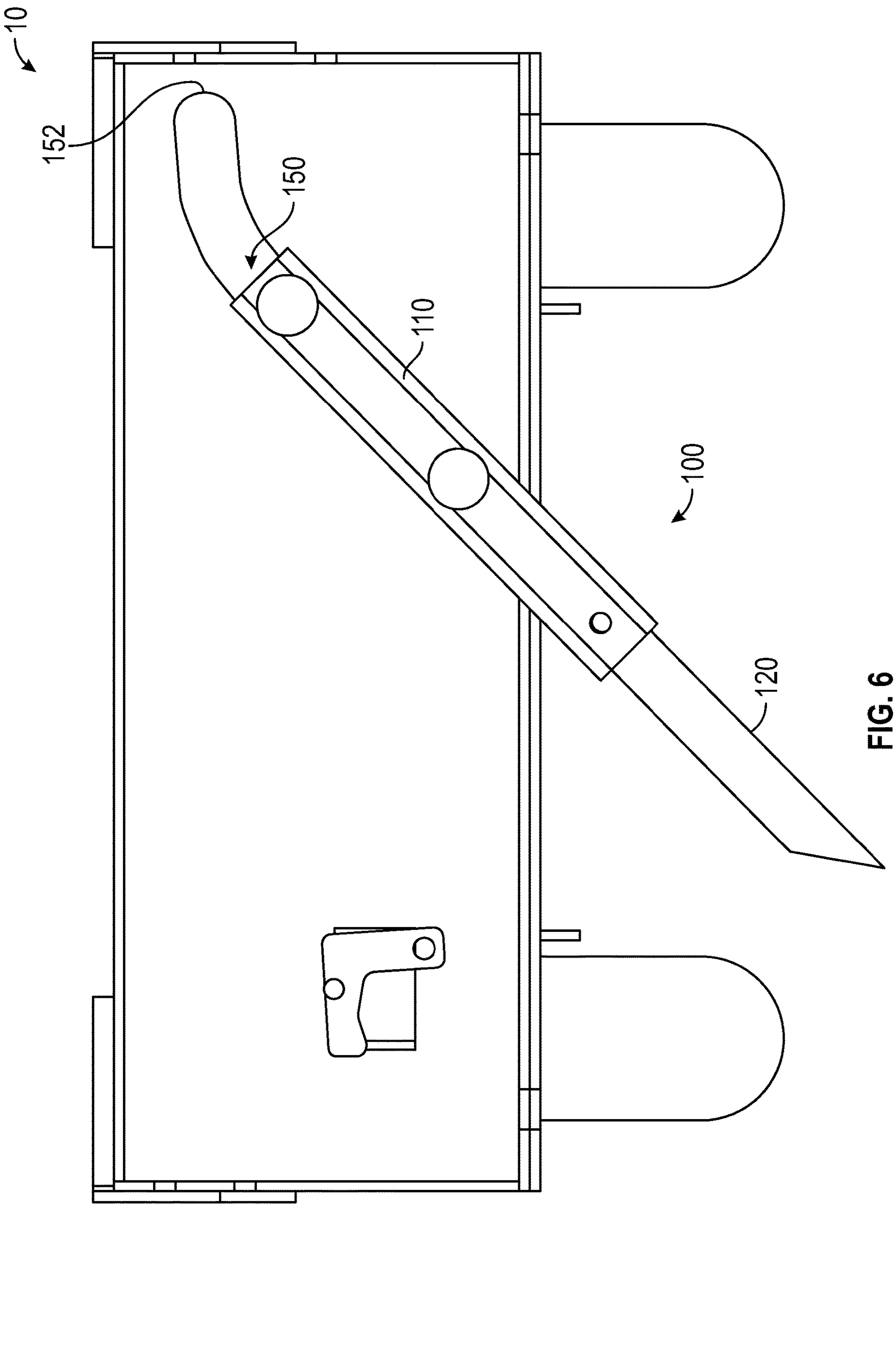
FIG. 6 is the rear elevation sectional view of FIG. 3 showing the spike assembly in the fully deployed configuration and the spike member in the engaged configuration.

Referring to FIGS. 3 and 4, a preferred embodiment of the trigger assembly includes a support bar 210 extending between the front and rear support walls of the support structure and a trigger bracket 220 pivotally coupled to the sleeve member of the spike assembly. The trigger bracket is selectively coupled to the support bar such that when the trigger bracket is coupled to the support bar, the trigger assembly is in the set configuration and when the trigger bracket is decoupled from the support bar, the trigger assembly is in the released configuration. It will be appreciated that, in other embodiments, the trigger assembly is pivotally coupled to the support bar and selectively coupled to one or more component of the trigger assembly, such as the sleeve member.

In some embodiments, the trigger bracket includes a first flange 222 extending generally upward from the sleeve member of the spike assembly and a second flange 224 extending generally aft of the upper end of the first flange when the trigger assembly is in the set configuration such that the second flange rests upon the support bar. In this way, at least part of the weight of the sleeve member and the spike member of the spike assembly are supported by the support bar of the trigger assembly through the trigger bracket of the trigger assembly. In some such embodiments, rotating the trigger bracket forward causes the second flange to disengage, thereby moving the trigger assembly from the set configuration to the released configuration.

In some embodiments, the trigger bracket further includes a third flange 226 extending upward from, and generally parallel with, the first flange. The third flange is configured to operate like a lever for moving the trigger assembly from the set configuration to the released configuration. In some such embodiments, an elongate member 240, such as a chain, is selectively coupled to the third flange of the trigger bracket. In this way, pulling on the elongate member causes the trigger assembly to move from the set configuration to the released configuration, thereby allowing the spike assembly to move from the stowed configuration to the deployed configuration.

In a preferred embodiment, such as shown in FIGS. 3 and 4, a first end 242 of the elongate member is selectively coupled to a safety cable or tether of a worker, such as through the tether clip of the trigger assembly. Consequently, the weight of the worker pulls on the trigger bracket when the worker falls from the elevated surface. In this way, the trigger assembly is moved from the set configuration to the released configuration when the worker falls from the elevated surface. In some such embodiments, a second end 244 of the elongate member and/or the safety cable or tether of the worker is also selectively coupled to the sleeve member and/or spike member of the spike assembly such that the weight of the worker causes the spike assembly to move from the stowed configuration towards the deployed configuration. In some such embodiments, the weight of the worker assists the spike member in piercing the elevated surface.

In a preferred embodiment of the present invention, the elongate member is coupled to the sleeve member such that a force from the weight of the worker is exerted on the sleeve member through the elongate member. In some embodiments, the elongate member is oriented relative to the sleeve member such that all, or a significant portion of, the weight of the worker is utilized in moving the spike member from the disengaged configuration to the engaged configuration. In some such embodiments, this is accomplished by the elongate member being parallel with, or relatively parallel with, the sleeve member at an instant in time after the trigger assembly is moved to the released configuration but just prior to the spike member being moved from the disengaged configuration. In other embodiments, the elongate member is oriented relative to the sleeve member such that all, or a significant portion of, the weight of the worker is utilized in assisting the spike member pierce the elevated surface. In some such embodiments, this is accomplished by the elongate member being parallel with, or relatively parallel with, the sleeve member for an instant in time when the spike member is in the engaged configuration but just prior to the spike member piercing the elevated surface. In still other embodiments, the elongate member is oriented relative to the sleeve member such that at least some of the weight of the worker is utilized in retaining the spike assembly in a fully deployed configuration. In some such embodiments, this is accomplished by the elongate member being parallel with, or relatively parallel with, the elevated surface when the spike assembly is in the fully deployed configuration. In other such embodiments, this is accomplished by the elongate member being oriented at an angle that is less than ninety (90) degrees above the spike member. In yet other embodiments, the elongate member is oriented relative to the sleeve member such that none, or nearly none, of the weight of the worker is utilized in retaining the spike assembly in a fully deployed configuration. In some such embodiments, this is accomplished by the elongate member being oriented perpendicularly to, or relatively perpendicularly to, the spike member when the spike assembly is in the fully deployed configuration.

A preferred embodiment of the brake system includes a double cam and a rod extending from the double cam. A lever is coupled to a distal end of the rod such that, by rotating the lever, a worker is able to move the double cam between a first configuration and a second configuration. A linkage member extends from each cam towards opposed wheels. When the double cam is in a first configuration, the linkages are displaced from the wheels so that the wheels can rotate freely. When the double cam is in a second configuration, the linkages engage the wheels so as to prevent or inhibit the wheels from rotating. In some embodiments, the brake system further includes one or more spring member biasing one or more of the linkage members towards one or more wheel, thereby biasing the double cam towards the second configuration.

In some embodiments, one or more wheel includes a perforated plate that is configured to receive a distal end of a corresponding linkage member. In this way, the distal end of the corresponding linkage member serves as a pin for resisting rotation without the use of a power source to overcome the output torque. In some such embodiments, the brake system is self-locking in the first and second configurations.

Some systems of the present invention are configured to be moved from site to site, such as on a trailer and/or on the back of a truck. In some embodiments, the system includes one or more fork pocket or other feature (each a "fork pocket") that is configured to assist with loading or unloading. In some embodiments, the system includes a plurality of fork pockets such that the system can be loaded and unloaded from a plurality of positions and orientations. In some embodiments, one or more fork pocket is defined at least partially by and/or is at least partially supported by a frame of the system. In some embodiments, the fork pockets are configured so as to allow a forklift to slide forks through the frame from any angle.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A mobile safety fall arrest system comprising:

a mobile structure that is configured to be moved along an elevated surface;

a spike assembly coupled to and supported by said mobile structure, said spike assembly being moveable between a stowed configuration and a deployed configuration; and a trigger assembly operatively coupled to said spike assembly, said trigger assembly being moveable between a set configuration and a released configuration, wherein said spike assembly includes a spike member, wherein said spike member is displaced from the elevated surface when said spike assembly is in the stowed configuration, wherein said spike member is configured to pierce the elevated surface as said spike assembly moves towards the deployed configuration, wherein said trigger assembly retains said spike assembly in the stowed configuration when said trigger assembly is in the set configuration, wherein said trigger assembly allows said spike assembly to move from the stowed configuration to the deployed configuration when said trigger assembly is in the released configuration, wherein said spike member is oriented at a first angle relative to said mobile cart when said spike assembly is in the deployed configuration and wherein said spike member is oriented at a second angle relative to said mobile cart when said spike assembly is in the stowed configuration, wherein the first angle is approximately forty-five (45) degrees, and wherein the second angle is less than forty-five (45) degrees.

2. The mobile safety fall arrest cart system of claim 1, further comprising an elongate member extending from said spike assembly such that tension in said elongate member biases said spike assembly towards the deployed configuration.

3. The mobile safety fall arrest system cart of claim 2, wherein said elongate member is engaged with said trigger assembly when said trigger assembly is in the set configuration such that the tension in said elongate member biases said trigger assembly towards the released configuration.

4. The mobile safety fall arrest system cart of claim 3, wherein said elongate member is disengaged from said trigger assembly when said trigger assembly is in the released configuration.

5. The mobile safety fall arrest system cart of claim 1, wherein said spike member is configured to pierce the elevated surface, and wherein said spike member moves to the first angle prior to said spike member piercing the elevated surface.

6. The mobile safety fall arrest system cart of claim 5, wherein said spike member is configured to penetrate the elevated surface a first distance as said spike assembly moves to the deployed configuration, and wherein said spike member remains at the first angle as said spike assembly moves to the deployed configuration.

7. The mobile safety fall arrest system cart of claim 6, wherein the tension in said elongate member is associated with a user falling from the elevated surface.

8. The mobile safety fall arrest system cart of claim 7, wherein said spike member comprises a proximal end coupled to a sleeve member of said spike assembly, a distal end that is configured to pierce the elevated surface, and a cylindrical main section extending between said proximal and distal ends of said spike member.

9. The mobile safety fall arrest system cart of claim 1, wherein said spike member comprises a proximal end coupled to a sleeve member of said spike assembly, a distal end that is configured to pierce the elevated surface, and a cylindrical main section extending between said proximal and distal ends of said spike member.

10. A method of arresting a fall, the method comprising:

positioning a spike assembly relative to an elevated surface while the spike assembly is in a stowed configuration such that a spike member of the spike assembly is displaced from the elevated surface; and coupling an elongate member to a user such that when the user falls, the weight of the user creates tension in the elongate member, wherein a trigger assembly is operatively coupled to the spike assembly in a set configuration prior to the user falling, the trigger assembly being configured to move from the set configuration to a released configuration upon the tension being created in the elongate member, wherein the spike member is configured to pierce the elevated surface as the spike assembly moves towards the deployed configuration, wherein the trigger assembly retains the spike assembly in the stowed configuration when the trigger assembly is in the set configuration, wherein the trigger assembly allows the spike assembly to move from the stowed configuration to the deployed configuration when the trigger assembly is in the released configuration, wherein said spike member is oriented at a first angle relative to said mobile cart when said spike assembly is in the deployed configuration and wherein said spike member is oriented at a second angle relative to said mobile cart when said spike assembly is in the stowed configuration, wherein the first angle is approximately forty-five (45) degrees, and wherein the second angle is less than forty-five (45) degrees.

11. The method of claim 10, wherein the tension in the elongate member biases the spike assembly towards the deployed configuration.

12. The method of claim 11, further comprising engaging the elongate member with the trigger assembly such that the tension in the elongate member causes the trigger assembly to move away from the set configuration prior to the tension in the elongate member biasing the spike assembly towards the deployed configuration.

13. The method of claim 12, wherein the elongate member is disengaged from the trigger assembly when the trigger assembly is in the released configuration.

14. The method of claim 13, wherein the spike member is configured to penetrate the elevated surface a first distance as the spike assembly moves to the deployed configuration, wherein the spike member moves to the first angle prior to the spike member penetrating the elevated surface, and wherein the spike member remains at the first angle as the spike assembly moves to the deployed configuration.

15. The method of claim 14, wherein the spike member comprises a proximal end coupled to a sleeve member of the spike assembly, a distal end that is configured to pierce the elevated surface, and a cylindrical main section extending between the proximal and distal ends of the spike member.

16. A fall arrest system comprising:

a spike assembly positioned relative to an elevated surface, said spike assembly being moveable between a stowed configuration and a deployed configuration; and a trigger assembly operatively coupled to said spike assembly, said trigger assembly being moveable between a set configuration and a released configuration, wherein said spike assembly includes a spike member, wherein said spike member is displaced from the elevated surface when said spike assembly is in the stowed configuration, wherein said spike member is configured to pierce the elevated surface as said spike assembly moves towards the deployed configuration, wherein said trigger assembly retains said spike assembly in the stowed configuration when said trigger assembly is in the set configuration, wherein said trigger assembly allows said spike assembly to move from the stowed configuration to the deployed configuration when said trigger assembly is in the released configuration, wherein said spike member is oriented at a first angle relative to said mobile cart when said spike assembly is in the deployed configuration and wherein said spike member is oriented at a second angle relative to said mobile cart when said spike assembly is in the stowed configuration, wherein the first angle is approximately forty-five (45) degrees, and wherein the second angle is less than forty-five (45) degrees.

17. The fall arrest system of claim 16, further comprising:

an elongate member extending from said spike assembly such that tension in said elongate member biases said spike assembly towards the deployed configuration, wherein said elongate member is engaged with said trigger assembly when said trigger assembly is in the set configuration such that the tension in said elongate member biases said trigger assembly towards the released configuration, wherein said elongate member is disengaged from said trigger assembly when said trigger assembly is in the released configuration, and wherein the tension in said elongate member is associated with a user falling.

* * * * *